2,802,043

ALKALINE ELECTRIC STORAGE BATTERY AND ELECTROLYTE THEREFOR

Arthur Fleischer, Northampton, Mass., assignor to Nickel Cadmium Battery Corporation, Easthampton, Mass., a corporation of Delaware No Drawing. Application May 3, 1954,
Serial No. 427,356

6 Claims. (Cl. 136—165)

The invention is especially directed to batteries of the nickel-cadmium type, and has for an object greatly to improve and maintain the capacity of the battery throughout repeated charge and discharge cycles by the provision of an alkaline electrolyte, e. g., potassium hydroxide, which incorporates cellulosic material that is soluble in the electrolyte.

Another object is notably to prolong the cycle life or efficiency of the negative battery plate by the addition to the alkaline electrolyte of an alkali-soluble cellulose substance.

Another object is to attain the above mentioned objects without the necessity of any change in the form or composition of any other component of the battery.

Another object is most emphatically to benefit the performance of sintered plates, although the invention is likewise applicable to other types of plates, such, for instance, as the pocket type.

Another object is to obtain the above mentioned advantages without incurring any substantial increase in cost of production or maintenance.

In brief summary, the invention involves the discovery and practical application of the fact that the addition to an alkaline electrolyte of cellulosic substance that is soluble in the electrolyte will, following the immersion of the plates in the electrolyte, enhance to a very high degree the efficiency of the battery by extending its full capacity life, and even increasing its capacity during a prolonged series of charging and discharging cycles. This has particular reference to the negative plate, and the sintered type of plate derives a peculiar benefit from the invention due to its porosity which invites penetration by the cellulose bearing electrolyte. Cellulose substances which perform to provide the advantageous effects of the invention comprehend both cellulose which is by nature alkali-soluble, e. g., beta-cellulose, and cellulose derivatives obtained by chemical modification of cellulose which renders them alkali-soluble.

A satisfactory derivative within the purview of the present invention is oxidized cellulose, a product resulting from the treatment of cellulose with nitrogen dioxide and tetraoxide. Tests made with this product in the form of powder, having a carboxyl content of ten to twelve percent, and in the form of gauze, having carboxyl contents of ten to twelve percent and sixteen to twenty-two percent, have demonstrated the above asserted beneficial effects. Thus, the powdered form was dissolved in the potassium hydroxide electrolyte (twenty-five percent KOH by weight, specific gravity 1.225) at a concentration of five grams per liter, and battery cells containing this composition were compared with similar cells containing potassium hydroxide without the added powder. After nearly one hundred cycles of charging and discharging, the negative plate capacity of the cell containing the electrolyte with the added oxidized cellulose in its solution showed no diminution, while that of the negative plate of the other cell dropped to less than forty percent of its starting capacity. Indeed, the cell containing the electrolyte of this invention actually exhibited a slight increase in plate capacity at the end of the test and a substantial increase during the test i. e., after about fifty cycles. The foregoing test was made with new cells i. e., during original formation when the electrolyte is first placed in the cell, but a similar test on cells which had been cycled fifty times with the standard electrolyte gave concurring results. In this test, one of the cells had the oxidized cellulose containing electrolyte (at a concentration of ten grams cellulose powder per liter) substituted for its standard potassium electrolyte, and the other cell was supplied with fresh standard electrolyte. The negative plate capacity of both plates had, at the end of the original fifty cycles, fallen to about seventy percent of starting capacity; but, following an additional one hundred and fifty cycles, the capacity of the cell containing the oxidized cellulose electrolyte returned to approximately one-hundred percent (over one-hundred percent in the zone between one-hundred and one-hundred seventy-five cycles), while the capacity of the cell containing the standard electrolyte continued its fall to approximately forty-five percent.

Another cellulose derivative used in tests of similar character was carboxymethylcellulose. This is a commercial product also known as CMC, or Carbose, or cellulose gum, and is a product of the reaction of strong sodium hydroxide solution with the alpha cellulose fraction of cellulosic substances (e. g., wood pulp), followed by squeezing to eliminate the beta cellulose, reaction with sodium chloracetate, and separation from sodium chloride. This derivative in powdered, fibrous-like, form was readily dissolved in the standard potassium hydroxide electrolyte solution by sprinkling into the stirred solution for about thirty minutes and continuing stirring for another thirty minutes. The concentration was ten grams per liter. Two cells, one containing the standard electrolyte and the other containing the electrolyte with the addition of the CMC, were cycled about one hundred and fifty times. The capacity (negative plate) of the former receded from approximately ninety-five percent to approximately forty-five percent, while the capacity of the latter cell (negative plate) receded from approximately ninety-six percent to approximately seventy percent.

A third derivative investigated was carboxymethyl hydroxyethylcellulose, which is a mixed ether produced in a manner similar to that above explained for CMC. It is commercially obtainable and is referred to as CMHEC. A test similar to that described in connection with CMC showed the capacity of the cell supplied with standard electrolyte dropping from approximately ninety-five percent to approximately forty-five percent, while the cell supplied with standard electrolyte containing CMHEC (concentration ten grams per liter) dropped only from approximately ninety-five percent to approximately seventy-eight percent.

A commercial product known as Natrosol, which is a grade or kind of the above defined CMC, was correspondingly tested and its cell showed a drop from approximately ninety-six percent to approximately eighty-three percent as contrasted with the drop from approximately ninety-five percent to approximately forty-five percent for the cell with standard electrolyte.

The response of beta cellulose when subjected to practical test within the concept of this invention was also explored. As is known, this compound is associated with alpha cellulose in varying amounts in certain natural substances, e. g., wood and other vegetable growths, but it has not been isolated so as to become commercially available. Consequently, for this test wood pulp was selected, the particular kind being one used in the manufacture of viscose rayon. Its composiiton, as given by the producer, was alpha cellulose 89.4 percent; beta cellulose 10.2 percent, and gamma cellulose 0.4 percent. This was ground in a pulp grinder and fifty grams were mixed with one liter of standard potassium electrolyte for two hours, after which the mixture was filtered either with a porous nickel plaque or with nainsook cloth on a vacuum filter. This produced a beta cellulose concentration of four and one half grams per liter. Lower concentrations were also produced by dilution of the filtered mixture with standard electrolyte. Three cells, one containing the standard electrolyte and the others containing standard electrolyte with the addition of beta cellulose in concentrations of two and one-quarter and four and one-half grams per liter, were cycled about one hundred and fifty times with the result that the capacity of the cell having the standard electrolyte shrank from approximately ninety-two percent to approximately thirty-two percent; the capacity of the cell having electrolyte with the addition of beta cellulose at the concentration of two and one-quarter grams shrank from approximately ninety-eight percent to approximately seventy-three percent; and the capacity of the cell having electrolyte with the addition of beta cellulose at the concentration of four and one-half grams shrank from approximately ninety-seven percent to approximately sixty-five percent.

The field of cellulosic substances amenable to the requirements of this invention was broadened by the discovery and determination of the availability of regenerated cellulose in the form of cellophane, free of plasticizers. For this test cellophane sheet 0.003 inch thick was cut into small pieces, about one eighth by one half an inch, and fifty grams thereof was shaken with one liter of the potassium hydroxide electrolyte for two hours, at room temperature. The mixture was then filtered on nainsook cloth and was poured into one cell as the electrolyte; the other cell containing the standard potassium electrolyte. On cycling these two cells about seventy times, the capacity of the cell having the electrolyte with the addition of cellophane rose from approximately ninety-two percent to approximately one hundred and nine percent (at forty cycles) and then decreased to approximately one hundred percent at the end; while the capacity of the cell with standard electrolyte steadily fell from approximately eighty-eight percent to approximately fifty-two percent.

All the hereinabove described tests were made with cells comprising sintered plates. As is known, it is customary in the production of sintered plates for nickel cadmium batteries to submit them to a fourfold repetition of the impregnation procedure including soaking in strong nickel (for the positive plate) or cadmium (for the negative plate) salt solution, followed by cathodic polarization, washing and drying. Such procedure was followed in preparing the plates for the above tests. However in order to broaden the scope of the investigation, similar tests were run with sintered plates which had been subjected to a three-fold impregnation, and even to only a single impregnation, with correspondingly comparable results.

The demonstration of the merit of this invention was still further extended by tests conducted with cells of nickel cadmium batteries embodying pocket type plates as distinguished from sintered plates.

For the first of these tests, a batch of standard potassium hydroxide electrolyte with the addition thereto of beta cellulose was prepared as heretofore explained except that only twenty grams (instead of fifty) were mixed with one liter of standard electrolyte, which produced a beta cellulose concentration of two and one fifth grams per liter and with the further exception that the insoluble alpha cellulose was retained in suspension when this electrolyte was poured into the cell. At the outset of the test, two cells containing standard electrolyte were cycled nineteen times with the result that the capacity (negative plate) of one cell dropped from approximately ninety-five percent to approximately seventy-nine percent, while the capacity of the second cell dropped from approximately ninety-six percent to approximately eighty percent. Thereupon, the beta cellulose containing electrolyte was substituted for the standard electrolyte in the first cell and the cycling of both cells was continued to about one hundred times. In this continued cycling, the capacity of the first cell (with the beta cellulose) rose at seventy-five cycles to approximately eighty-seven percent, and was approximately eighty-two percent at the end; while the capacity of the second cell with standard electrolyte fell steadily to approximately fifty-eight percent.

Finally, a pair of cells with plates of the pocket type and the negative plate having active material different from that of the preceding test, were tested. Both cells supplied with standard electrolyte were cycled nineteen times, and the capacity of the first cell lessened from approximately eighty-six percent to approximately seventy-one percent, while the capacity of the second cell lessened from approximately eighty-eight percent to approximately seventy percent. Then, the electrolyte of the first cell was substituted by standard electrolyte containing the heretofore described cellulose derivative known as Natrosol, at a concentration of ten grams per liter, and cycling of both cells was resumed to about one hundred times, during which the capacity of the first cell (with Natrosol) rose to approximately eighty-nine percent, while the capacity of the second cell (with standard electrolyte) fell to approximately fifty-three percent.

In all the tests with the sintered plates, the charging was for about fifteen hours at two amperes while the discharging was mostly at thirty-seven and one-half amperes, although experiments were made at discharge rates of three, ten, and thirty amperes to check the reliability of the thirty-seven and one-half rate. This is especially so with respect to experiments at the ten ampere rate because the loss in capacity was found to be greatest at that rate and it thus served to confirm and extend the results of the testing program in general. For tests with the pocket type plates, the charge was for about fifteen hours at one ampere and the discharge at fifteen amperes. In all cases, both sintered plates and pocket type, the cell was composed of three plates, two positive and one negative, using standard separators (polyethylene filament) and the capacity measurement was that of the negative plate.

The effect which variations in the concentration of the cellulose ingredient in the electrolyte would have in terms of cell capacity on cycling was also studied. When using the wholly alkali-soluble cellulosic substances, the proportion of ten grams per liter heretofore recited equalled a concentration of one percent. Additional tests at proportions of one-half gram, one gram, two grams, and five grams, were conducted, with the conclusion that the optimum effect is obtainable at proportions of from one to two grams per liter, the precise point depending, at least to some extent, upon the volume of electrolyte per plate.

By way of summarizing, it is clearly evident from the foregoing that the presence of cellulose dissolved in the alkaline electrolyte has a notably beneficial effect upon the capacity of the battery cell, both with respect to maintaining existing capacity (sometimes with increase), and also restoring lost capacity. The effect is steady, as though active plate material, which had become electrochemically inactive, were re-activated for participation in the reactions of charging and discharging. The mode of utilizing the invention is the height of simplicity, merely involving the addition of the cellulose to the electrolyte, as instanced several times hereinabove, and then pouring the solution into the battery cell in the usual manner. The improved electrolyte may be added to a completely assembled battery whether the plates thereof have or have not previously been subjected to forming cycles, and is suitable for any type of alkaline battery, especially nickel cadmium. Cellulose compounds, soluble in alkaline electrolyte and adapted to the present invention are commercially available in various forms, and cellulose compounds, only part of which are thus soluble, may also be used, as the non-soluble portion may be separated before the electrolyte is poured into the cell or be permitted to precipitate thereafter.

The invention is to be sharply distinguished from previous practices directed to the prolongation of plate cycle life by the introduction of so called "expanders" into the active material of the plate. Those practices are not only much more complicated, but they also entail difficulties of a practical nature, emphatically in connection with sintered plates and also with organic compounds.

I desire it to be understood that various changes may be resorted to in materials, proportions, concentrations, procedural steps and the order thereof, and in other factors relating to embodiments of the invention without departing from the spirit or scope thereof, and, hence, I do not intend to be limited to details herein set forth except as they are included in the claims or are required by disclosures of the prior art.

What I claim is:

1. An alkaline electric storage battery embodying positive and negative plates and a liquid alkaline electrolyte in which the plates are immersed, there being dissolved in the electrolyte a cellulose substance at a concentration within the range of one gram to ten grams of the cellulose substance per liter of electrolyte to increase the efficiency and prolong the life of the battery.

2. A battery as defined in claim 1, in which the cellulose substance is beta cellulose.

3. A battery as defined in claim 1, in which the cellulose substance is a cellulose derivative.

4. A battery as defined in claim 1, in which the cellulose substance is a regenerated cellulose.

5. A battery as defined in claim 1, in which the plates are of the sintered type.

6. A battery as defined in claim 1, in which the plates are of the pocket type.

References Cited in the file of this patent

UNITED STATES PATENTS

| | | |
|---|---|---|
| 1,863,208 | Schorger | June 14, 1932 |
| 2,696,515 | Koren et al. | Dec. 7, 1954 |

FOREIGN PATENTS

| | | |
|---|---|---|
| 263,587 | Great Britain | Jan. 6, 1927 |
| 605,629 | France | Feb. 20, 1926 |

OTHER REFERENCES

"Cellulose Chemistry," by Heuser (1944), pub. by John Wiley & Sons, Inc. London, p. 119 cited.